United States Patent
Stempfle et al.

(10) Patent No.: US 11,795,266 B2
(45) Date of Patent: *Oct. 24, 2023

(54) METHOD FOR PREPARING A MIXED SILANE-TERMINATED POLYMER

(71) Applicant: Covestro Intellectual Property GmbH & Co. KG, Leverkusen (DE)

(72) Inventors: Florian Stempfle, Cologne (DE); Hans-Josef Laas, Odenthal (DE); Christoph Thiebes, Cologne (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/611,931

(22) PCT Filed: May 25, 2020

(86) PCT No.: PCT/EP2020/064380
§ 371 (c)(1),
(2) Date: Nov. 17, 2021

(87) PCT Pub. No.: WO2020/239663
PCT Pub. Date: Dec. 3, 2020

(65) Prior Publication Data
US 2022/0204683 A1    Jun. 30, 2022

(30) Foreign Application Priority Data
May 27, 2019  (EP) .................................. 19176824

(51) Int. Cl.
| | |
|---|---|
| *C08G 18/12* | (2006.01) |
| *C08G 18/71* | (2006.01) |
| *C08G 18/22* | (2006.01) |
| *C08G 18/28* | (2006.01) |
| *C08G 18/48* | (2006.01) |
| *C08G 18/75* | (2006.01) |

(52) U.S. Cl.
CPC ........... *C08G 18/718* (2013.01); *C08G 18/12* (2013.01); *C08G 18/222* (2013.01); *C08G 18/289* (2013.01); *C08G 18/4845* (2013.01); *C08G 18/755* (2013.01)

(58) Field of Classification Search
None
See application file for complete search history.

(56) References Cited

U.S. PATENT DOCUMENTS

| | | | |
|---|---|---|---|
| 3,494,951 A | 2/1970 | Berger | |
| 3,627,722 A | 12/1971 | Seiter | |
| 3,632,557 A | 1/1972 | Brode et al. | |
| 3,996,172 A * | 12/1976 | Olstowski | C08K 5/0008 528/48 |
| 4,345,053 A | 8/1982 | Rizk et al. | |
| 4,788,310 A | 11/1988 | Stein et al. | |
| 4,826,915 A | 5/1989 | Stein et al. | |
| 5,068,304 A | 11/1991 | Higuchi et al. | |
| 5,364,955 A * | 11/1994 | Zwiener | C07F 7/1804 556/420 |
| 5,393,910 A | 2/1995 | Mui et al. | |
| 5,990,257 A | 11/1999 | Johnston et al. | |
| 7,319,128 B2 | 1/2008 | Ziche et al. | |
| 10,336,863 B2 | 7/2019 | Bolt et al. | |
| 2007/0055010 A1 | 3/2007 | Ludewig et al. | |
| 2010/0036050 A1* | 2/2010 | Iwa | C08G 65/2663 524/588 |
| 2012/0245241 A1 | 9/2012 | Peiffer et al. | |
| 2013/0252140 A1* | 9/2013 | Facke | C09D 175/04 430/2 |
| 2015/0266995 A1 | 9/2015 | Wolan et al. | |
| 2015/0274760 A1 | 10/2015 | Spyrou et al. | |
| 2015/0335568 A1* | 11/2015 | Lein | A61K 8/35 424/61 |
| 2016/0009738 A1 | 1/2016 | Vu et al. | |
| 2017/0240689 A1 | 8/2017 | Kramer et al. | |
| 2018/0208813 A1* | 7/2018 | Boyer | C08G 18/4018 |
| 2020/0339729 A1 | 10/2020 | Stempfle et al. | |

FOREIGN PATENT DOCUMENTS

| | | |
|---|---|---|
| AU | 2015100195 A4 | 5/2015 |
| CN | 107815145 A | 3/2018 |
| DE | 102004012876 A1 | 10/2005 |
| EP | 978523 A1 | 2/2000 |
| GB | 1534258 A | 5/1978 |

OTHER PUBLICATIONS

International Search Report, PCT/EP2020/064380, dated Aug. 20, 2020, Authorized officer: Sandra Lanz.
Liebich, A., "Determination of organotin compounds in sediments by means of GC-AED—Development of extraction and derivatization methods," Technische Universität Berlin, 2005.

* cited by examiner

*Primary Examiner* — Margaret G Moore
(74) *Attorney, Agent, or Firm* — THE WEBB LAW FIRM

(57) ABSTRACT

The present invention relates to a process for preparing a mixed silane-terminated polymer by reacting a polyol component A) with a diisocyanate component B) comprising 1-isocyanato-3,3,5-trimethyl-5-isocyanatomethylcyclohexane (isophorone diisocyanate), at least one isocyanatosilane C) and an aminosilane E), in which the urethanization reaction is carried out in the presence of at least one catalyst D) which is free of organically bonded tin. The invention further relates to the use of the polymers thus obtained.

13 Claims, No Drawings

METHOD FOR PREPARING A MIXED SILANE-TERMINATED POLYMER

CROSS-REFERENCE TO RELATED APPLICATION

This application is a national stage application under 35 U.S.C. § 371 of PCT/EP2020/064380, filed May 25, 2020, which claims the benefit of European Application No. 19176824.1, filed May 27, 2019, each of which is incorporated herein by reference.

FIELD

The present invention relates to a process for preparing a mixed silane-terminated polymer by reacting a polyol component A) with a diisocyanate component B) comprising 1-isocyanato-3,3,5-trimethyl-5-isocyanatomethylcyclohexane (isophorone diisocyanate), at least one isocyanatosilane C) and an aminosilane E), in which the urethanization reaction is carried out in the presence of at least one catalyst D) which is free of organically bonded tin. The invention further relates to the use of the polymers thus obtained.

BACKGROUND

Silane-terminated polymers refers generally to alkoxysilane-functional polymers, in particular alkoxysilane-functional polyurethanes. Polymers of this kind are used, for example, as moisture-curing one-component polyurethanes in coating compositions, sealants and adhesives, in particular in the construction sector and in the automobile industry.

Various synthesis routes are known for preparing silane-terminated polymers. According to U.S. Pat. No. 3,627,722 A or 3,632,557 A, for example, amino-functional alkoxysilanes can be reacted with NCO-containing prepolymers, forming a urea group, to give alkoxy-functional polyurethanes. Such alkoxysilane-functional polyurethanes crosslink relatively rapidly and cure to give non-tacky materials with good strength and extensibility. However, such polymers have a high viscosity on account of the urea groups formed during the preparation, which makes the formulation of compositions with good processability markedly more difficult.

According to EP 0 070 475 A2 and U.S. Pat. No. 5,990,257 A, an alternative synthesis route consists in the reaction of NCO-containing alkoxysilanes with hydroxy-functional prepolymers, with the silane group being joined to the polymer to form a urethane group. Examples of hydroxy-functional prepolymers that may be used here are hydroxy-functional polyurethanes which can be obtained by reaction of diisocyanates with diols, or long-chain diols which have not been pre-extended via a reaction with diisocyanates (EP 0372561 A2). One disadvantage of this synthesis route consists in that the required NCO-containing alkoxysilanes are of only limited storability and are often expensive.

Alternatively, a hybrid method combining both synthesis routes described hereinabove can be used to obtain silane-terminated polymers which contain both silane groups which are joined to the polymer backbone via urea groups and also those silane groups which are joined to the polymer backbone via urethane groups. These silane-terminated polymers are referred to as "mixed" silane-terminated polymers and are disclosed for example in AU 2015100195 A4 and US 2015/0266995 A1.

In the synthesis of these mixed silane-terminated polymers, but also in the synthesis of the NCO-containing prepolymers and the conversion of the hydroxy-functional polymers, catalysts are used to accelerate the NCO/OH reaction. These are typically dialkyltin(IV) compounds, such as for example dibutyltin dilaurate or dibutyltin oxide. However, tertiary amines and various metal complexes for example of titanium, bismuth or zirconium, are also described. The use of β-diketonate compounds of various transition group metals for acceleration of the NCO/OH reaction is also known (DE 10 2004 012 876).

Recently, however, the organotin compounds most frequently used have been identified as potential carcinogens in humans. They accordingly represent undesirable constituents and in the longer term are to be substituted due to their toxicological properties.

However, a simple exchange of the organotin compounds is not always possible since the choice of the catalyst often also has an effect on the properties of the alkoxysilane-functional polyurethanes, and of the curable compositions produced therefrom. For example, EP 2 625 226 B1 describes the reaction of isocyanatosilanes with polyethers in the presence of bismuth neodecanoate. This results in markedly shortened skin forming times compared to dibutyltin dilaurate-based compositions. The viscosity and also the storage stability of the prepolymers are also negatively impacted by the choice of catalyst (cf. EP 1 535 940).

In order to obtain sprayable, rollable or spreadable formulations, as low as possible a viscosity is generally desirable. The addition of organic solvents and/or large amounts of plasticizers having a diluting action is therefore often necessary. Large amounts of all of these additives are generally undesirable, however. In addition, for example, plasticizers can "exude" from the product over the course of time, which is likewise disadvantageous. In order to nevertheless obtain readily processible formulations, as low as possible a viscosity is desirable, in particular in the case of the urea group-containing STPs which inherently have a relatively high viscosity.

SUMMARY

It was therefore an object of the present invention to provide low-viscosity mixed silane-terminated polymers in which the reaction of the hydroxyl groups of the polyol with the isocyanate groups of the diisocyanate or of the isocyanatosilane does not require the use of catalysts containing organic tin compounds.

This object was achieved by a process as claimed in claim 1. Advantageous developments are specified in the dependent claims. They may be freely combined, unless the context clearly suggests otherwise. The invention further relates to a use as claimed in claim 14.

The present invention is based on the surprising observation that the choice of suitable organotin-free catalysts affords mixed silane-terminated polymers which have a low viscosity and which contain both silane groups which are joined to the polymer backbone via urea groups and also those silane groups which are joined to the polymer backbone via urethane groups.

DETAILED DESCRIPTION

The invention proposes a process for preparing a mixed silane-terminated polymer by reacting a polyol component A) with a diisocyanate component B) comprising 1-isocyanato-3,3,5-trimethyl-5-isocyanatomethylcyclohexane (isophorone diisocyanate), with at least one isocyanatosilane C) and with an aminosilane E), in which the urethanization reaction is carried out in the presence of at least one catalyst D) which is free of organically bonded tin.

The polyol components A) used in the process according to the invention are any desired polyols, for example the polymeric polyether polyols, polyester polyols, polycarbonate polyols, polyurethane polyols and/or polyacrylate polyols known from polyurethane chemistry. These generally have an average functionality of 1.8 to 6, preferably of 1.8 to 4, particularly preferably of 1.9 to 2.2. The number-average molecular weight of these polyols (determined in accordance with DIN 55672-1:2016-03) is generally from 3000 to 24 000, preferably from 5000 to 16 000, particularly preferably from 7000 to 12 000. It is also possible to use any desired mixtures of such polyols.

Typically, the polyol components A) have OH numbers, determined in accordance with DIN 53240, of at least 4.5 mg KOH/mg. The OH number is preferably in the range from 8 to 30 mg KOH/g, particularly preferably from 8 to 20 mg KOH/g, most preferably from 9 to 18 mg KOH/g.

Preferred polyol components A) for the process according to the invention are polyether polyols, for example those of the type specified in DE 26 22 951 B, column 6 line 65 to column 7 line 26, EP-A 0 978 523, page 4 line 45 to page 5 line 14, or WO 2011/069 966, page 4 line 20 to page 5 line 23, provided that they meet the specifications made above in terms of functionality and molecular weight. Polyether polyols that are particularly preferred as polyol components A) are addition products of ethylene oxide and/or propylene oxide onto propane-1,2-diol, propane-1,3-diol, glycerol, trimethylolpropane, ethylenediamine and/or pentaerythritol, or the polytetramethylene ether glycols of the molecular weight range specified above which are obtainable by polymerizing tetrahydrofuran.

Very particularly preferred polyol components A) are polyether polyols based on polypropylene oxide, such as are commercially available for example from Covestro Deutschland AG under the Acclaim® trade name, for example Acclaim® 8200 N.

The diisocyanate component B) used in the process according to the invention contains 1-isocyanato-3,3,5-trimethyl-5-isocyanatomethylcyclohexane (isophorone diisocyanate, IPDI), which can be prepared by any desired processes, for example by phosgenation or via a phosgene-free route, for example by urethane cleavage.

In addition to IPDI, the diisocyanate component B) can also contain proportions of further diisocyanates, for example up to 20 mol % based on the amount of IPDI used.

Preferred diisocyanates which may be present alongside IPDI in the diisocyanate component B) are those of the general formula (I)

OCN—Y—NCO (I)

in which Y is a linear or branched, aliphatic or cycloaliphatic radical having 4 to 18 carbon atoms or an optionally substituted aromatic or araliphatic radical having 6 to 18 carbon atoms.

Suitable examples are, for example, 1,4-diisocyanatobutane, 1,6-diisocyanatohexane (HDI), 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, hexahydrotolylene 2,4- and/or 2,6-diisocyanate (H6-TDI), 1-isocyanato-1-methyl-4(3)-isocyanatomethylcyclohexane, 2,4'- and 4,4'-diisocyanato-dicyclohexylmethane (H12-MDI), 1,3- and 1,4-bis(isocyanatomethyl)cyclohexane, 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (XDI), 1,3- and 1,4-bis(1-isocyanato-1-methylethyl)benzene (TMXDI), bis(4-(1-isocyanato-1-methylethyl)phenyl) carbonate, phenylene 1,3- and 1,4-diisocyanate, tolylene 2,4- and 2,6-diisocyanate (TDI) and any desired mixtures of these isomers, diphenylmethane 2,4'- and/or 4,4'-diisocyanate (MDI) and naphthylene 1,5-diisocyanate (NDI) and any desired mixtures of such diisocyanates.

The diisocyanate component B) used is particularly preferably exclusively IPDI.

The isocyanatosilanes C) used in the process according to the invention are any desired compounds in which at least one, preferably precisely one, isocyanate group and at least one, preferably precisely one, silane group having at least one alkoxy substituent are simultaneously present alongside one another. The isocyanatosilanes C) are also referred to hereafter as alkoxysilane-functional isocyanates C) or as isocyanatoalkoxysilanes C).

Examples of suitable isocyanatoalkoxysilanes C) are isocyanatoalkylalkoxysilanes as are obtainable, for example, by the processes described in U.S. Pat. No. 3,494,951, EP-A 0 649 850, WO 2014/063 895 and WO 2016/010 900 via a phosgene-free route by means of thermal cleavage of the corresponding carbamates or ureas.

According to a further preferred embodiment, the alkoxysilane-functional isocyanate (isocyanatosilane) C) used is at least one compound of general formula (II)

(II)

in which

R$^1$, R$^2$ and R$^3$ independently of one another are identical or different saturated or unsaturated, linear or branched, aliphatic or cycloaliphatic or optionally substituted aromatic or araliphatic radicals which have up to 18 carbon atoms and may optionally contain up to 3 heteroatoms from the group of oxygen, sulfur, nitrogen, preferably in each case alkyl radicals which have up to 6 carbon atoms and/or alkoxy radicals which have up to 6 carbon atoms and may contain up to 3 oxygen atoms, particularly preferably in each case methyl, methoxy and/or ethoxy, with the proviso that at least one of the radicals R$^1$, R$^2$ and R$^3$ is joined to the silicon atom via an oxygen atom, and X is a linear or branched organic radical having up to 6, preferably 1 to 4, carbon atoms, particularly preferably a propylene radical (—CH$_2$—CH$_2$—CH$_2$—).

Examples of such isocyanatoalkoxysilanes include isocyanatomethyltrimethoxysilane, (isocyanatomethyl)methyldimethoxysilane, isocyanatomethyltriethoxysilane, (isocyanatomethyl)methyldiethoxysilane, isocyanatomethyltriisopropoxysilane, 2-isocyanatoethyltrimethoxysilane, 2-isocyanatoethyltriethoxysilane, 2-isocyanatoethyltriisopropoxysilane, 3-isocyanatopropyltrimethoxysilane, 3-isocyanatopropyltriethoxysilane, 3-isocyanatopropylmethyldimethoxysilane, 3-isocyanatopropylmethyldiethoxysilane, 3-isocyanatopropylethyldiethoxysilane, 3-isocyanatopropyldimethylethoxysilane, 3-isocyanatopropyldiisopropylethoxysilane, 3-isocyanatopropyltripropoxysilane, 3-isocyanatopropyltriisopropoxysilane, 3-isocyanatopropyltributoxysilane, 3-isocyanatopropylmethyldibutoxysilane, 3-isocyanatopropylphenyldimethoxysilane, 3-isocyanatopropylphenyldiethoxysilane, 3-isocyanatopropyltris(methoxyethoxyethoxy)silane, 2-isocyanatoisopropyltrimethoxysilane, 4-isocyanatobutyltrimethoxysilane, 4-isocyanatobutyltriethoxysilane, 4-isocyanatobutyltriisopropoxysilanes, 4-isocyanatobutylmethyldimethoxysilane, 4-isocyanatobutylmethyldiethoxysilane, 4-isocyanatobutylethyldimethoxysilane, 4-isocyanatobutylethyldiethoxysilane, 4-isocyanatobutyldimethylmethoxysilane, 4-isocyanatobutylphenyldimethoxysilane, 4-isocyanatobutylphenyldiethoxysilane, 4-isocyanato(3-methylbutyl)trimethoxysilane, 4-isocyanato(3-methylbutyl)triethoxysilane, 4-isocyanato(3-methylbutyl)methyldimethoxysilane, 4-isocyanato(3-methylbutyl)methyldiethoxysilane and 11-isocyanatoundecyltrimethoxysilane or any desired mixtures of such isocyanatoalkoxysilanes.

Preferred isocyanatosilanes C) are in particular isocyanatomethyltrimethoxysilane, isocyanatomethyltriethoxysilane, (isocyanatomethyl)methyldimethoxysilane, (isocyanatomethyl)methyldiethoxysilane, 3-isocyanatopropyltrimethoxysilane, 3-isocyanatopropylmethyldimethoxysilane, 3-isocyanatopropyltriethoxysilane and 3-isocyanatopropylmethyldiethoxysilane. Particular preference is given to the use of 3-isocyanatopropyltrimethoxysilane.

The molar amounts of IPDI-containing diisocyanate component B) and isocyanatosilane C) used in the process according to the invention are guided by the molar amount of hydroxyl groups of polyol component A) and the desired ratio of isocyanatosilane C) to IPDI-containing diisocyanate component B). The total molar amount of isocyanatosilane C) and IPDI-containing diisocyanate component B) is preferably chosen such that in the process product according to the invention the hydroxyl groups of the polyol have been completely converted to urethane groups.

In order to make the process according to the invention as cost-effective as possible, it is advantageous to minimize the proportion of isocyanatosilane C). Preferably, the molar amount of isocyanatosilane C) used is accordingly at most 50 mol % based on the number of hydroxyl groups of polyol component A). In general, the molar amount of isocyanatosilane C) used in the process according to the invention is in the range from 1 to 50 mol %, preferably in the range from 5 to 28 mol %, particularly preferably in the range from 10 to 28 mol %, very particularly preferably in the range from 10 to 25 mol %, in each case based on the number of hydroxyl groups of polyol A).

Depending on the chosen molar amount of isocyanatosilane C), the IPDI-containing diisocyanate component B) is generally used in the process according to the invention in a molar amount of 50 to 99 mol %, preferably of 72 to 95 mol %, particularly preferably of 72 to 90 mol %, very particularly preferably in a molar amount of 75 to 90 mol %, in each case based on the number of hydroxyl groups of polyol A).

The reaction of the polyol component A) with the IPDI-containing diisocyanate component B) and the isocyanatosilane C) is effected in the presence of a catalyst D) which is free of organically bonded tin. In the context of the present invention, the definition of the catalyst component as free of organic tin compounds is such that the content of organic tin compounds in the reaction mixture which leads to the polyurethane and hence also in the polyurethane obtained is ≤0.06% by weight and preferably ≤0.01% by weight, based on the total weight of the alkoxysilane group-containing polyurethane.

The quantitative determination of the content of organic tin compounds is effected by extraction of the sample (optionally) with n-hexane, derivatization (optionally) with sodium tetraethylborate and gas chromatography, preference being given to detection by means of atomic emission. Details can be found, for example, in the dissertation "Bestimmung von Organozinnverbindungen in Sedimenten mittels GC-AED—Entwicklung von Extraktions—und Derivatisierungsmethoden" [Determination of organotin compounds in sediments by means of GC-AED—Development of extraction and derivatization methods] by Almut Liebich, Technische Universitat Berlin, 2005, (http://dx-.doi.org/10.14279/depositonce-1164).

In particular, no organotin-based catalysts such as DBTL (dibutyltin dilaurate) are used in the reaction in this case. In general, all compounds in which there is a covalent Sn—C bond can be defined as organic tin compounds.

This also includes not introducing any organic tin catalyst residues from any precursors such as polyurethane prepolymers into the reaction mixture for the process according to the invention.

The catalyst D) is selected from:
an organometallic compound, preferably a beta-diketonate compound, of magnesium, zinc, gallium, scandium, lanthanum, cerium, praseodymium, neodymium, promethium, samarium, europium, gadolinium, terbium, dysprosium, holmium, erbium, thulium, ytterbium, yttrium or lutetium,
a zinc carboxylate,
or mixtures thereof.

In the context of the invention, the term "organometallic compound" denotes a compound which has at least one ligand bonded to the abovementioned metals (Me) via an oxygen atom. Compounds of this kind which are suitable according to this invention have ligands which are selected from the group consisting of alkoxy group, sulfonate group, carboxylate group, dialkylphosphate group, dialkylpyrophosphate group and beta-diketonate group, where all ligands may be identical or different from each other.

There are restrictions concerning the use of ytterbium(III) acetylacetonate, a beta-diketonate compound, which are described further below (see description of the β-diketonate compounds).

What are known as neoalkoxy substituents, in particular of the formula (III), have proven to be particularly suitable alkoxy groups in particular.

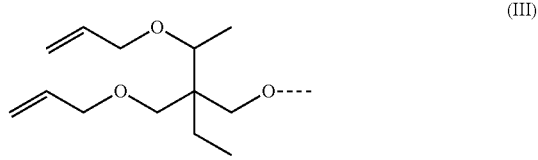
(III)

In particular, aromatic sulfonic acids the aromatic systems of which have been substituted by an alkyl group have proven to be particularly suitable sulfonic acids. Preferred sulfonic acids are radicals of the formula (IV).

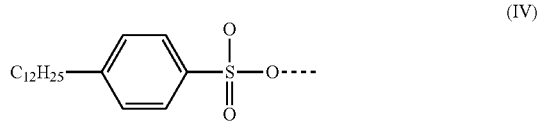

(IV)

In particular, carboxylates of fatty acids have proven to be particularly suitable carboxylate groups. Preferred carboxylates are decanoate, stearate and isostearate.

In particular, the catalyst has at least one polydentate ligand, also called chelating ligand. The polydentate ligand is in particular a bidentate ligand.

The bidentate ligand is preferably a ligand of the formula (V)

(V)

Here, radical $R^4$ is a hydrogen atom or a linear or branched alkyl group having 1 to 8 carbon atoms, in particular is a methyl group. Radical $R^5$ is a hydrogen atom or a linear or branched alkyl group having 1 to 8 carbon atoms and optionally having heteroatoms, in particular is a hydrogen atom. Radical $R^6$ is a hydrogen atom or an alkyl group having 1 to 8, in particular having 1 to 3, carbon atoms or is a linear or branched alkoxy group having 1 to 8, in particular having 1 to 3, carbon atoms.

The catalyst D) is preferably a compound of the formula (VI).

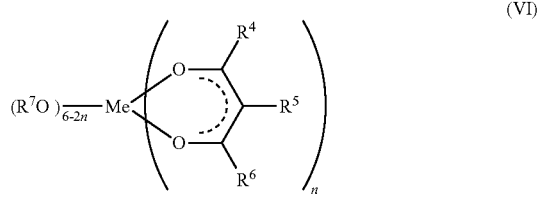

(VI)

Me = the metals stated in the description

The radicals $R^4$, $R^5$ and $R^6$ have already been described above. The radical $R^7$ is a linear or branched alkyl radical having 2 to 20 carbon atoms, in particular is an isobutyl or an isopropyl radical. n is a value of 1 or 2, in particular 2.

Preference is given to organometallic compounds of the formula (VI), where the radical $R^4$ is a methyl group, the radical $R^5$ is a hydrogen atom, the radical $R^6$ is a methyl group or methoxy or ethoxy group and the radical $R^7$ is an isobutyl or an isopropyl radical.

The preferred beta-diketonate compound is based on the mentioned metals preferably in the main oxidation states +III or +IV thereof (if such exists). Particular preference is given to β-diketonate compounds based on Yb(III) and/or Ga(III).

β-diketonate compounds of magnesium, zinc, gallium, scandium, lanthanum, cerium, praseodymium, neodymium, promethium, samarium, europium, gadolinium, terbium, dysprosium, holmium, erbium, thulium, ytterbium, yttrium or lutetium are understood to be all compounds of these metals which have at least one ligand or substituent which is derived from a β-diketone by anion formation, preferably by deprotonation, and which consequently has one or more structural units of the formula (VII).

(VII)

$R^8$, $R^9$ independently of one another here are identical or different, optionally heteroatom-containing organic radicals having preferably in each case 1-20, particularly preferably 1-10 carbon atoms.

The β-diketonate compounds used preferably have exclusively ligands/substituents of the β-diketonate type.

The process according to the invention can be carried out in various ways. These are described further below and are identified as "process A", "process B" and "process C". In process C, the preferred β-diketonate used is acetylacetone ('acac'). Very particular preference is given here to the use of Yb(acac)₃ and/or Ga(acac)₃. In the processes A and B, the sole use of Yb(acac)₃ is excluded. The use of Yb(acac)₃ in a mixture with other catalysts of the invention is possible. Preference is given in processes A and B to the use of Ga(acac)₃ or a mixture of Yb(acac)₃ with other catalysts of the invention, for example of Yb(acac)₃ with Ga(acac)₃.

Suitable zinc carboxylates are in particular those having a ring structure in the organic radical. Preference is given to using aliphatic zinc carboxylates as catalysts D). Examples are those the carboxylic acid radicals of which have a carbon chain of 20 or fewer, preferably 18, particularly preferably less than or equal to 12 or fewer, carbon atoms. Particular preference is given to zinc 2-ethylhexanoate (also called zinc octanoate), zinc n-octanoate, zinc n-decanoate, zinc neodecanoate, zinc ricinoleate and zinc stearate.

It is in addition also possible that the catalysts D) according to the invention contain water of crystallization.

The catalysts D) can be used individually or in the form of any desired mixtures with one another and are used in this case for example in amounts of 0.001% to 1% by weight, preferably 0.01% to 0.5% by weight, calculated as the total weight of catalysts used based on the total weight of the coreactants A), B) and C).

Examples of suitable aminosilanes E) are aminosilanes of the general formula (VIII)

(VIII)

in which
$R^1$, $R^2$, $R^3$ and X have the definition given for formula (II) and
$R^{10}$ is hydrogen, a saturated or unsaturated, linear or branched, aliphatic or cycloaliphatic or an optionally substituted aromatic or araliphatic radical having up to 18 carbon atoms or a radical of the formula

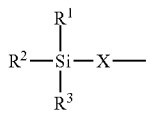

in which $R^1$, $R^2$, $R^3$ and X have the definition given above.

Suitable aminosilanes of general formula (VIII) are for example 3-aminopropyltrimethoxysilane, 3-aminopropyltriethoxysilane, 3-aminopropylmethyldimethoxysilane, 3-aminopropylmethyldiethoxysilane, 3-aminopropylethyldiethoxysilane, 3-aminopropyldimethylethoxysilane, 3-aminopropyldiisopropylethoxysilane, 3-aminopropyltripropoxysilane, 3-aminopropyltributoxysilane, 3-aminopropylphenyldiethoxysilane, 3-aminopropylphenyldimethoxysilane, 3-aminopropyltris(methoxyethoxyethoxy)silane, 2-aminoisopropyltrimethoxysilane, 4-aminobutyltrimethoxysilane, 4-aminobutyltriethoxysilane, 4-aminobutylmethyldimethoxysilane, 4-aminobutylmethyldiethoxysilane, 4-aminobutylethyldimethoxysilane, 4-aminobutylethyldiethoxysilane, 4-aminobutyldimethylmethoxysilane, 4-aminobutylphenyldimethoxysilane, 4-aminobutylphenyldiethoxysilane, 4-amino(3-methylbutyl)methyldimethoxysilane, 4-amino(3-methylbutyl)methyldiethoxysilane, 4-amino(3-methylbutyl)trimethoxysilane, 3-aminopropylphenylmethyl-n-propoxysilane, 3-aminopropylmethyldibutoxysilane, 3-aminopropyldiethylmethylsilane, 3-aminopropylmethylbis(trimethylsiloxy)silane, 11-aminoundecyltrimethoxysilane, N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, N-(2-aminoethyl)-3-aminopropyltrimethoxysilane, N-(2-aminoethyl)-3-aminoisobutylmethyldimethoxysilane, N-(2-aminoethyl)-3-aminopropylmethyldimethoxysilane, N-(2-aminoethyl)-3-aminopropyltris(2-ethylhexoxy)silane, N-(6-aminohexyl)-3-aminopropyltrimethoxysilane, N-benzyl-N-(2-aminoethyl)-3-aminopropyltrimethoxysilane, bis(3-trimethoxysilylpropyl)amine, bis(3-triethoxysilylpropyl)amine, (aminoethylaminomethyl)phenethyltrimethoxysilane, 3-ureidopropyltriethoxysilane, 3-(m-aminophenoxy)propyltrimethoxysilane, m- and/or p-aminophenyltrimethoxysilane, 3-(3-aminopropoxy)-3,3-dimethyl-1-propenyltrimethoxysilane, 3-aminopropylmethylbis(trimethylsiloxy)silane, 3-aminopropyltris(trimethylsiloxy)silane, 3-aminopropylpentamethyldisiloxane or any desired mixtures of such aminosilanes.

Preferred aminosilanes of the general formula (VIII) are those in which
$R^1$, $R^2$ and $R^3$ are each alkyl radicals having up to 6 carbon atoms and/or alkoxy radicals which contain up to 3 oxygen atoms, with the proviso that at least one of the radicals $R^1$, $R^2$ and $R^3$ is an alkoxy radical of this kind,
X is a linear or branched alkylene radical having 3 or 4 carbon atoms, and
$R^{10}$ is a saturated linear or branched, aliphatic or cycloaliphatic radical having up to 6 carbon atoms or a radical of the formula

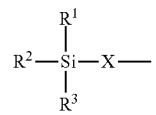

in which $R^1$, $R^2$, $R^3$ and X have the definition given above.

Particularly preferred aminosilanes of the general formula (VIII) are those in which
$R^1$, $R^2$ and $R^3$ are each methyl, methoxy and/or ethoxy, with the proviso that at least one of the radicals $R^1$, $R^2$ and $R^3$ is a methoxy or ethoxy radical,
X is a propylene radical ($-CH_2-CH_2-CH_2-$), and
$R^{10}$ is a linear alkyl radical having up to 4 carbon atoms or a radical of the formula

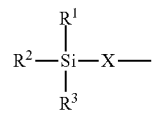

in which $R^1$, $R^2$, $R^3$ and X have the definition given above.

Very particularly preferred aminosilanes of the general formula (VIII) are N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, bis(3-trimethoxysilylpropyl)amine and/or bis(3-triethoxysilylpropyl)amine.

Suitable aminosilanes E) are, for example, also those of the general formula (IX)

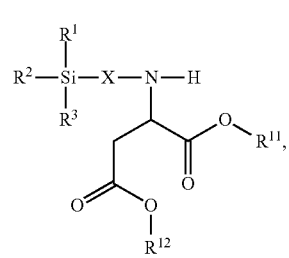

in which $R^1$, $R^2$ and $R^3$ have the definition given for formula (II),
X is a linear or branched organic radical having at least 2 carbon atoms and
$R^{11}$ and $R^{12}$ independently of one another are saturated or unsaturated, linear or branched, aliphatic or cycloaliphatic or aromatic organic radicals which have 1 to 18 carbon atoms, are substituted or unsubstituted and/or have heteroatoms in the chain.

These aminosilanes of the general formula (IX) are the silane-functional aspartic esters obtainable according to the teaching of EP-A 0 596 360 by reacting aminosilanes bearing primary amino groups with fumaric esters and/or maleic esters.

Suitable starting compounds for preparation of aminosilanes of the general formula (IX) are therefore, in principle, any aminosilanes of the general formula (X)

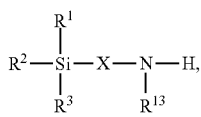 (X)

in which $R^1$, $R^2$, $R^3$ and X have the definition given for formula (II) and $R^{13}$ is hydrogen.

These are reacted with fumaric diesters and/or maleic diesters of the general formula (XI)

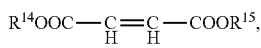 (XI)

in which the radicals $R^4$ and $R^{15}$ are identical or different radicals and are organic radicals having 1 to 18, preferably 1 to 9, particularly preferably 1 to 4, carbon atoms.

Preferred aminosilanes of the general formula (IX) are reaction products of aminosilanes of the general formula (X) in which $R^1$, $R^2$ and $R^3$ are each methyl, methoxy and/or ethoxy, with the proviso that at least one of the radicals $R^1$, $R^2$ and $R^3$ is a methoxy or ethoxy radical, X is a propylene radical ($-CH_2-CH_2-CH_2-$), and $R^{13}$ is hydrogen, with fumaric diesters and/or maleic diesters of the general formula (XI) in which the radicals $R^{14}$ and $R^{15}$ are identical or different radicals and are a methyl, ethyl, n-butyl or 2-ethylhexyl radical.

Particularly preferred aminosilanes of the general formula (IX) are reaction products of 3-aminopropyltrimethoxysilane and/or 3-aminopropyltriethoxysilane with diethyl maleate.

Suitable aminosilanes E) are, for example, also those of the general formula (XII)

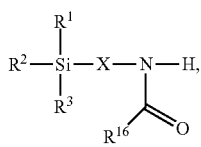 (XII)

in which $R^1$, $R^2$ and $R^3$ have the definition given for formula (II),

X is a linear or branched organic radical having at least 2 carbon atoms and $R^{16}$ is a saturated linear or branched, aliphatic or cycloaliphatic organic radical having 1 to 8 carbon atoms.

These aminosilanes of the general formula (XII) are the known silane-functional alkylamides as obtainable, for example, by the methods disclosed in U.S. Pat. Nos. 4,788,310 and 4,826,915, by reacting aminosilanes bearing primary amino groups with alkyl alkylcarboxylates with elimination of alcohol.

Suitable starting compounds for preparation of aminosilanes of the general formula (XII) are therefore, in principle, any aminosilanes of the general formula (XIII)

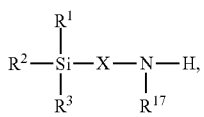 (XIII)

in which $R^1$, $R^2$, $R^3$ and X have the definition given for formula (II) and $R^{17}$ is hydrogen.

These are reacted with alkyl alkylcarboxylates of the general formula (XIV)

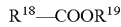 (IV)

in which $R^{18}$ is hydrogen or a saturated linear or branched, aliphatic or cycloaliphatic organic radical having 1 to 8 carbon atoms and $R^{19}$ is a saturated aliphatic organic radical having 1 to 4 carbon atoms.

Preferred aminosilanes of the general formula (XII) are reaction products of aminosilanes of the general formula (XIII) in which $R^1$, $R^2$ and $R^3$ are each methyl, methoxy and/or ethoxy, with the proviso that at least one of the radicals $R^1$, $R^2$ and $R^3$ is a methoxy or ethoxy radical, X is a propylene radical ($-CH_2-CH_2-CH_2-$), and $R^{17}$ is hydrogen, with alkyl formates of the general formula (XIV) in which $R^{18}$ is hydrogen and $R^{19}$ is a saturated aliphatic organic radical having 1 to 4 carbon atoms.

Particularly preferred aminosilanes E) of the general formula (XII) are reaction products of 3-aminopropyltrimethoxysilane and/or 3-aminopropyltriethoxysilane with methyl formate and/or ethyl formate.

To carry out the process according to the invention, the polyol component A) is reacted with the IPDI-containing diisocyanate component B) and the isocyanatosilane C).

To this end, the polyol component A), optionally under an inert gas such as for example nitrogen, is initially charged at a temperature between 20 and 100° C. Then, it is possible to add the IPDI-containing diisocyanate component B) and the isocyanatosilane C) either as a mixture or simultaneously in parallel (process A; see below) or successively in the sequence specified above (process B; see below), or first only the IPDI-containing diisocyanate component B) (process C; see below) in the amount specified above, and the temperature of the reaction mixture for the urethanization reaction optionally adjusted by a suitable means (heating or cooling) to 30° C. to 120° C., preferably from 50° C. to 100° C.

The catalyst D) to be jointly used may in this case already be admixed in the amount specified above with one or more of the coreactants, the polyol component A), the IPDI-containing diisocyanate component B) and/or the isocyanatosilane C), or with a mixture of components B) and C), prior to the start of the actual reaction. However, the catalyst D) can also be added to the reaction mixture at any desired point in time during the metered addition or thereafter.

The progress of the urethanization reaction can be monitored by determining the NCO content by titrimetric means, for example. After reaching the desired NCO content, in processes A) and B) preferably after complete conversion of the hydroxyl groups of polyol component A), the aminosilane E) is metered into the reaction mixture in the amount specified above. The conversion of the free isocyanate groups to urea groups is typically likewise effected in the temperature range specified above of 30° C. to 120° C., preferably of 50° C. to 100° C.

After the isocyanate/amine reaction has ended, that is to say when no free NCO groups are detectable in the reaction mixture any longer, mixed silane-terminated polymers in accordance with the invention are already present in the case of processes A and B. In process C, in contrast, this is followed by the further reaction step of urethanization of the free hydroxyl groups still present with an isocyanatosilane C). For this, the isocyanatosilane C) is added in the amount specified above and the reaction temperature is adjusted to a value within the temperature range specified above for the urethanization reaction.

Irrespective of the nature and amount of the starting compounds A) to E) used and of the embodiment of the process according to the invention chosen, the process products obtained are clear, virtually colorless mixed silane-terminated polymers which generally have color numbers of below 120 APHA, preferably of below 80 APHA, particularly preferably of below 60 APHA, and feature a low viscosity and an improved storage stability.

For the preparation of the mixed silane-terminated polymers according to the invention, the hydroxyl groups of the polyol component A) can be reacted simultaneously with the isophorone diisocyanate (IPDI)-containing diisocyanate component B) and at least one isocyanatosilane C) in the presence of a catalyst D). In a second reaction step, preferably after complete urethanization, the free NCO groups of the reaction product are then reacted with an aminosilane E). (Within the context of the invention, this process is called "process A").

Alternatively, it is also possible to first react only the isocyanatosilane C) with some of the hydroxyl groups of the polyol component A). In a second step, the still-free hydroxyl groups of the polymer are then reacted with the IPDI-containing diisocyanate component B). The catalyst D) here is generally added to the reaction mixture already from the start, but at the latest prior to addition of the IPDI-containing diisocyanate component B). Then, preferably after complete urethanization, an aminosilane E) is added in such an amount that, and reacted with the free NCO groups of the prepolymer obtained until, no free NCO groups are detectable in the reaction mixture any longer. (Within the context of the invention, this process is called "process B").

In a further embodiment of the process according to the invention, first, some of the hydroxyl groups of the polyol component A) are reacted with the IPDI-containing diisocyanate component B). After reaching the desired NCO content, preferably when at least 40% of the NCO groups have reacted, in a second step the aminosilane is added in such an amount that, and reacted with the free NCO groups of the OH- and NCO-functional prepolymer obtained in the first step until, no free NCO groups are detectable in the reaction mixture any longer. The still-free hydroxyl groups of the reaction product are then finally reacted with the isocyanatosilane C). (Within the context of the invention, this process is called "process C").

In the process according to the invention, the amount of aminosilane E) is preferably chosen such that an isocyanate group-free product is formed as the process product. To this end, the amount of aminosilane E) is generally chosen such that there are from 0.9 to 1.2, preferably from 0.95 to 1.2, particularly preferably from 0.95 to 1.05, very particularly preferably from 1.0 to 1.05, amino groups for each isocyanate group of the isocyanate prepolymers obtained as intermediate in processes A and B and of the OH- and NCO-functional prepolymers obtained as intermediate in process C.

In the possible embodiments of the process according to the invention described in more detail hereinafter, aminosilanes E) are used. In the embodiments identified as process A and process B, the NCO groups of the isocyanate prepolymers obtained as intermediate, and in process C, the NCO groups of the OH- and NCO-functional prepolymer obtained as intermediate, are respectively reacted with an amount of aminosilanes E) such as until no free NCO groups are detectable in the reaction mixture any longer.

The mixed silane-terminated polymers prepared with the process according to the invention are outstandingly suitable for use in all known applications for silane-terminated polymers, for example as binders for paint, sealant or adhesive raw materials. They are especially suitable as moisture-curing adhesives with excellent long-term stability and good processability. On account of their low viscosity, they render the addition of plasticizers superfluous. The silane-terminated polymers can in particular be used as adhesives on porous substrates.

Examples

Unless stated otherwise, all percentages and all ppm figures relate to the total weight of the reaction mixture.

The NCO contents were determined by titrimetry according to DIN EN ISO 11909.

OH numbers were determined by titrimetry according to DIN 53240 T.2.

All viscosity measurements were made with a Physica MCR 51 rheometer from Anton Paar Germany GmbH (Germany) to DIN EN ISO 3219.

The Hazen color number was measured by spectrophotometry according to DIN EN ISO 6271-2:2004 with a LICO 400 spectrophotometer from Lange, Germany.

The reported molecular weights are in each case number-average molecular weights (Mn) which can be determined by gel permeation chromatography.

For the practical performance of the following examples, it should be noted that the contents in the substances used of the groups that are relevant to the respective reaction (e.g. amine content of the aminosilane) have been determined by specific determination methods (e.g. titration) and the amounts actually used have been calculated on the basis of contents of in each case 100%.

Synthesis of Mixed Silane-Terminated Polymers

Process A (Also Comparative Example)

In a 2 l sulfonation flask with lid, stirrer, thermometer and nitrogen flow, 1369.3 g (0.16 mol) of a propylene glycol with an OH number of 13.2 (Acclaim© Polyol 8200 N from Covestro Deutschland AG; Leverkusen, Germany) were prepolymerized with 35.8 g (0.16 mol) of isophorone diisocyanate and 34.2 g (0.16 mol) of 3-isocyanatopropyltrimethoxysilane (Geniosil® GF 40 from Wacker Chemie AG; Munich, Germany) at 60° C. with addition of 40 ppm (60 mg) of dibutyltin dilaurate until the theoretical NCO content of 0.47% had been reached. Subsequently, 56.2 g (0.16 mol) of diethyl N-(3-trimethoxysilylpropyl)aspartate (prepared according to EP-A 596 360, example 5) were rapidly added dropwise and the mixture was stirred until it was no longer possible to observe any isocyanate band in the IR spectrum. The polyurethane prepolymer having alkoxysilyl end groups that was obtained had a viscosity of 12 900 mPas and a color number of 16 APHA.

Process B (Also Comparative Example)

In a 2 l sulfonation flask with lid, stirrer, thermometer and nitrogen flow, 1369.3 g (0.16 mol) of a propylene glycol with an OH number of 13.2 (Acclaim® Polyol 8200 N from Covestro Deutschland AG; Leverkusen, Germany) were stirred with 34.2 g (0.16 mol) of 3-isocyanatopropylt-rimethoxysilane (Geniosil® GF 40 from Wacker Chemie AG; Munich, Germany) at 60° C. with addition of 40 ppm (60 mg) of dibutyltin dilaurate until it was no longer possible to observe any isocyanate band in the IR spectrum. Subsequently, 35.8 g (0.16 mol) of isophorone diisocyanate were rapidly added dropwise and prepolymerization was effected until the theoretical NCO content of 0.47% had been reached. After addition of 56.2 g (0.16 mol) of diethyl N-(3-trimethoxysilylpropyl)aspartate (prepared according to EP-A 596 360, example 5), the mixture was stirred until it was no longer possible to observe any isocyanate band in the IR spectrum. The polyurethane prepolymer having alkoxysilyl end groups that was obtained had a viscosity of 13 600 mPas and a color number of 18 APHA.

Process C (Also Comparative Example)

In a 2 l sulfonation flask with lid, stirrer, thermometer and nitrogen flow, 1369.3 g (0.16 mol) of a propylene glycol with an OH number of 13.2 (Acclaim© Polyol 8200 N from Covestro Deutschland AG; Leverkusen, Germany) were prepolymerized with 35.8 g (0.16 mol) of isophorone diisocyanate at 60° C. with addition of 40 ppm (60 mg) of dibutyltin dilaurate until the theoretical NCO content of 0.47% had been reached. After addition of 56.2 g (0.16 mol) of diethyl N-(3-trimethoxysilylpropyl)aspartate (prepared according to EP-A 596 360, example 5), the mixture was stirred until it was no longer possible to observe any isocyanate band in the IR spectrum. Thereafter, 34.2 g (0.16 mol) of 3-isocyanatopropyltrimethoxysilane (Geniosil® GF 40 from Wacker Chemie AG; Munich, Germany) were rapidly added dropwise and the mixture was stirred again until it was no longer possible to observe any isocyanate band in the IR spectrum. The polyurethane prepolymer having alkoxysilyl end groups that was obtained had a viscosity of 13 000 mPas and a color number of 20 APHA.

These examples show that by using the tin-containing catalyst known from the prior art, irrespective of the process chosen, mixed silane-terminated polymers having a low viscosity can be obtained. The viscosity of the mixed silane-terminated polymers obtained in the process is also influenced, inter alia, by the choice of the catalyst.

The synthesis of the mixed silane-terminated polymers using an organotin-free catalyst D) is effected in this case according to the procedures described hereinabove, the DBTL catalyst not in accordance with the invention accordingly being replaced. The following viscosities of the obtained polymers resulted:

| No. | Catalyst (amount of catalyst) | Process | Viscosity |
| --- | --- | --- | --- |
| CE 1 | Valikat® Bi 2810 (bismuth(III) neodecanoate) (160 ppm) | Process A | 30 900 mPas |
| CE 2 | Valikat® Bi 2810 (bismuth(III) neodecanoate) (160 ppm) | Process B | 26 800 mPas |
| CE 3 | Valikat® Bi 2810 (bismuth(III) neodecanoate) (160 ppm) | Process C | 24 600 mPas |
| CE 4 | K-Kat 348® (bismuth(III) 2-ethylhexanoate) (160 ppm) | Process A | 29 700 mPas |
| CE 5 | K-Kat 348® (bismuth(III) 2-ethylhexanoate) (160 ppm) | Process B | 29 800 mPas |
| CE 6 | K-Kat 348® (bismuth(III) 2-ethylhexanoate) (160 ppm) | Process C | 30.00 mPas |
| IE 1 | Zinc(II) 2-ethylhexanoate (160 ppm) | Process A | 17 800 mPas |
| IE 2 | Zinc(II) 2-ethylhexanoate (160 ppm) | Process B | 20 300 mPas |
| IE 3 | Zinc(II) 2-ethylhexanoate (160 ppm) | Process C | 20 400 mPas |
| IE 4 | Ytterbium(III) acetylacetonate (120 ppm) | Process C | 12 600 mPas |
| IE 5 | Gallium(III) acetylacetonate (160 ppm) | Process A | 17 100 mPas |
| IE 6 | Gallium(III) acetylacetonate (160 ppm) | Process B | 16 100 mPas |
| IE 7 | Gallium(III) acetylacetonate (160 ppm) | Process C | 21 200 mPas |

CE = comparative example
IE = according to the invention

The invention claimed is:

1. A process for preparing a mixed silane-terminated polymer by reacting a polyol component A) with a diisocyanate component B) comprising isophorone diisocyanate, with at least one isocyanatosilane C) and with an aminosilane E), in which a urethanization reaction is carried out in the presence of at least one catalyst D) which is free of organically bonded tin,
   wherein the process is conducted so that
   first, some of the hydroxyl groups of the polyol component A) are reacted with the diisocyanate component B) and, after reaching a predetermined NCO content, in a second step the aminosilane is added and reacted with free NCO groups of an OH- and NCO-functional prepolymer obtained in the first step, wherein the aminosilane is added in such an amount that no free NCO groups are detectable in a reaction mixture any longer, and still-free hydroxyl groups of a reaction product are then finally reacted with the isocyanatosilane C),
   wherein the catalyst D) comprises:
      an organometallic compound of magnesium, zinc, gallium, scandium, lanthanum, cerium, praseodymium, neodymium, promethium, samarium, europium, gadolinium, terbium, dysprosium, holmium, erbium, thulium, ytterbium, yttrium or lutetium, an organometallic compound being understood to be a compound which has at least one ligand bonded to the above mentioned metals via an oxygen atom, and the ligands being selected from the group consisting of alkoxy group, sulfonate group, carboxylate group, dialkylphosphate group, dialkylpyrophosphate group and β-diketonate group, where all ligands may be identical or different from each other,
      or mixtures of the above mentioned compounds.

2. The process as claimed in claim 1,
   wherein the catalyst D) comprises:
      a beta-diketonate compound of magnesium, zinc, gallium, scandium, lanthanum, cerium, praseodymium, neodymium, promethium, samarium, europium, gadolinium, terbium, dysprosium, holmium, erbium, thulium, ytterbium, yttrium or lutetium,
      a zinc carboxylate,
      or mixtures of the above mentioned compounds.

3. A process for preparing a mixed silane-terminated polymer by reacting a polyol component A) with a diisocyanate component B) comprising isophorone diisocyanate, with at least one isocyanatosilane C) and with an aminosilane E), in which the urethanization reaction is carried out in the presence of at least one catalyst D) which is free of organically bonded tin,
wherein the process is conducted so that
i) the hydroxyl groups of the polyol component A) are reacted simultaneously with the diisocyanate component B) and at least one isocyanatosilane C) in the presence of a catalyst D) and in a second reaction step, free NCO groups of a reaction product are then reacted with an aminosilane E),
or
ii) the isocyanatosilane C) is reacted with some of the hydroxyl groups of the polyol component A) and in a second step still-free hydroxyl groups of the polymer are then reacted with the diisocyanate component B) and then, an aminosilane E) is added and reacted with free NCO groups of the prepolymer obtained, wherein the aminosilane is added in such an amount that no free NCO groups are detectable in a reaction mixture any longer,
wherein the catalyst D) consists of:
an organometallic compound consisting of gallium, scandium, lanthanum, praseodymium, neodymium, promethium, samarium, europium, gadolinium, terbium, dysprosium, holmium, erbium, thulium, ytterbium, yttrium or lutetium, an organometallic compound being understood to be a compound which has at least one ligand bonded to the above mentioned metals via an oxygen atom, and the ligands being selected from the group consisting of alkoxy group, sulfonate group, carboxylate group, dialkylphosphate group, dialkylpyrophosphate group and β-diketonate group, where all ligands may be identical or different from each other,
or mixtures of the above mentioned compounds,
wherein the sole use of ytterbium(III) acetylacetonate as catalyst D) is excluded.

4. The process as claimed in claim 3, wherein the catalyst D) consists of:
a beta-diketonate compound of magnesium, zinc, gallium, scandium, lanthanum, cerium, praseodymium, neodymium, promethium, samarium, europium, gadolinium, terbium, dysprosium, holmium, erbium, thulium, ytterbium, yttrium or lutetium,
a zinc carboxylate,
or mixtures of the above mentioned compounds,
wherein the sole use of ytterbium(III) acetylacetonate as catalyst D) is excluded.

5. The process as claimed in claim 3, wherein the polyol component A) is a polyether polyol having a number-average molecular weight in a range from 3000 to 24 000 g/mol.

6. The process as claimed in claim 3, wherein the polyol component A) is a polyether polyol based on polypropylene oxide.

7. The process as claimed in claim 3, wherein the isocyanate component B) contains exclusively isophorone diisocyanate.

8. The process as claimed in claim 3, wherein the isocyanatosilane C) is a compound of the formula (II)

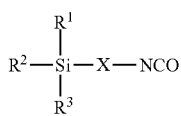

(II)

in which
$R^1$, $R^2$ and $R^3$ independently of one another are identical or different saturated or unsaturated, linear or branched, aliphatic or cycloaliphatic or optionally substituted aromatic or araliphatic radicals which have up to 18 carbon atoms and may optionally contain up to 3 heteroatoms from the group of oxygen, sulfur, nitrogen, and
X is a linear or branched organic radical having up to 6 carbon atoms.

9. The process as claimed in claim 3, wherein the isocyanatosilane C) used is 3-isocyanatopropyltrimethoxysilane.

10. The process as claimed in claim 3, wherein the aminosilane E) is a compound of the formula (VIII)

(VIII)

in which $R^1$, $R^2$, and $R^3$ independently of one another are identical or different saturated or unsaturated, linear or branched, aliphatic or cycloaliphatic or optionally substituted aromatic or araliphatic radicals which have up to 18 carbon atoms and may optionally contain up to 3 heteroatoms from the group of oxygen, sulfur, nitrogen, and
X is a linear or branched organic radical having up to 6 carbon atoms
and
$R^{10}$ is hydrogen, a saturated or unsaturated, linear or branched, aliphatic or cycloaliphatic or an optionally substituted aromatic or araliphatic radical having up to 18 carbon atoms or a radical of the formula

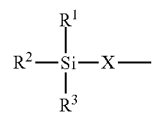

in which $R^1$, $R^2$, $R^3$ and X have the definition given above.

11. The process as claimed in claim 3, wherein the aminosilane E) is a compound of the formula (IX)

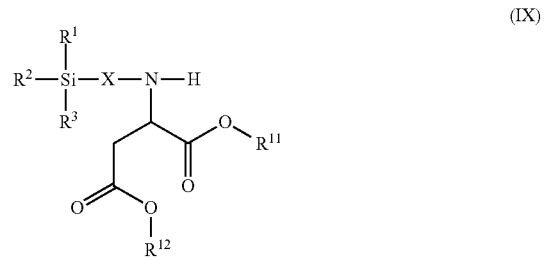

(IX)

in which
$R^1$, $R^2$ and $R^3$ independently of one another are identical or different saturated or unsaturated, linear or branched, aliphatic or cycloaliphatic or optionally substituted aromatic or araliphatic radicals which have up to 18 carbon atoms and may optionally contain up to 3 heteroatoms from the group of oxygen, sulfur, nitrogen, and X is a linear or branched organic radical having at least 2 carbon atoms and $R^{11}$ and $R^{12}$ independently of one another are saturated or unsaturated, linear or branched, aliphatic or cycloaliphatic or aromatic organic radicals which have 1 to 18 carbon atoms, are substituted or unsubstituted and/or have heteroatoms in the chain.

12. The process as claimed in claim 3, wherein the amount of aminosilane E) is chosen such that there are 0.9 to 1.2 amino groups for each isocyanate group of an isocyanate- and silane-functional polymer formed in the process.

13. The process as claimed in claim 3, wherein the molar amount of the isocyanatosilane C) used is in the range from 1 to 50 mol %, preferably in the range from 5 to 28 mol %, particularly preferably in the range from 10 to 28 mol %, very particularly preferably in the range from 10 to 25 mol %, and the molar amount of the diisocyanate B) used is accordingly in the range from 50 to 99 mol %, preferably in the range from 72 to 95 mol %, particularly preferably in the range from 72 to 90 mol %, very particularly preferably in the range from 75 to 90 mol %, based on the number of hydroxyl groups of polyol A).

* * * * *